US012507022B2

(12) United States Patent
Hook

(10) Patent No.: US 12,507,022 B2
(45) Date of Patent: Dec. 23, 2025

(54) SYSTEMS AND METHODS FOR BLIND SENSITIVITY MATCHING FOR MICROPHONE CAPSULES IN A MICROPHONE ARRAY

(71) Applicant: Valeo Telematik und Akustik GmbH, Friedrichsdorf (DE)

(72) Inventor: Brandon S. Hook, Friedrichsdorf (DE)

(73) Assignee: Valeo Telematik und Akustik GmbH, Friedrichsdorf (DE)

( * ) Notice: Subject to any disclaimer, the term of this patent is extended or adjusted under 35 U.S.C. 154(b) by 121 days.

(21) Appl. No.: 18/213,163

(22) Filed: Jun. 22, 2023

(65) Prior Publication Data

US 2024/0430633 A1 Dec. 26, 2024

(51) Int. Cl.
*H04R 29/00* (2006.01)

(52) U.S. Cl.
CPC ....... *H04R 29/006* (2013.01); *H04R 2499/13* (2013.01)

(58) Field of Classification Search
CPC .... H04R 29/006; H04R 2499/13; H04R 3/00; H04R 3/005
See application file for complete search history.

(56) References Cited

U.S. PATENT DOCUMENTS 9,337,794 B2 5/2016 Yamada
11,290,809 B2 3/2022 Hook
11,303,994 B2 4/2022 Hook
2003/0161484 A1* 8/2003 Kanamori .............. H04R 3/005 381/71.7
2004/0057593 A1* 3/2004 Pedersen .............. H04R 29/006 381/312
2011/0313763 A1* 12/2011 Amada .................. H04R 3/005 381/92

(Continued)

FOREIGN PATENT DOCUMENTS

WO 2010144577 A1 12/2010
WO 2021009111 A1 7/2020

OTHER PUBLICATIONS

1 Extended European Search Report for European Application No. 24183501.6, Dated Nov. 26, 2024, 6 Pages.

*Primary Examiner* — Jason R Kurr
(74) *Attorney, Agent, or Firm* — Valeo Telematik und Akustik GmbH

(57) ABSTRACT

A method for sensitivity matching of microphone capsules in a microphone array includes: determining, for at least two microphone capsules in a microphone array, an average raw sound exposure amplitude value; calculating an average error value for the at least two microphone capsules based on the average raw sound exposure amplitude value and respective sensitivity-adjusted exposure values for each microphone capsule of the at least two microphone capsules; determining, based on the average error value, a first gain step value for at least one microphone capsule of the at least two microphone capsules; determining, based on a minimum gain value and a maximum gain value, a second gain step value for each microphone capsule of the at least one microphone capsule of the at least two microphone capsules; and adjusting a gain of the at least one microphone capsule based on the second gain step value.

18 Claims, 9 Drawing Sheets

(56) References Cited

U.S. PATENT DOCUMENTS

| | | | | |
|---|---|---|---|---|
| 2013/0156224 | A1* | 6/2013 | Keane | H04R 3/04<br>381/107 |
| 2021/0014605 | A1* | 1/2021 | Hook | H04R 3/005 |
| 2021/0151033 | A1* | 5/2021 | Furukawa | H04R 3/005 |

* cited by examiner

400

Calculating the "StepPOS" and StepNEG

How much actual gain will be applied to the previous gain value. (this value is bounded by the MinGain and MaxGain parameters which change upon startup)

```
If PauseAdapt = true   GainSte
 p = 0
 End
 StepPOS = 1+ GainStep
 StepNEG = 1- GainStep
```

428

Calculating "PauseAdapt"

Many conditions must be satisfied before allowing gain adaption to begin and/or continue. The "PauseAdapt" signal is used to pause gain adaption.

430

```
If "NoiseLevel" < minimum threshold, OR Wind_Detected = true

        PauseAdapt = true

Else If minimum threshold < "NoiseLevel" < maximum threshold,

        If VoiceDetected = true
                                PauseAdapt = true
                End

Else if "NoiseLevel" > maximum threshold,

                PauseAdapt = false
End
```

FIG. 4C

400

Calculating the gain term

For example: x1_Gain[n], which will be applied to the next coming sample x1 [n+1].

```
If X1_cond[n] < Ref_cond[n],
                    x1_Gain[n] = x1_Gain[n-1] *
StepPOS
Else
                    x1_Gain[n] = x1_gain[n-1] *
StepNEG
End

If x1_Gain[n] <= MinGain,
                    x1_Gain[n] = MinGain
Else if             x1_Gain[n] >= MaxGain,
                    x1_Gain[n] = MaxGain
End
```

448

FIG. 4E

SYSTEMS AND METHODS FOR BLIND SENSITIVITY MATCHING FOR MICROPHONE CAPSULES IN A MICROPHONE ARRAY

TECHNICAL FIELD

The present disclosure relates to microphone capsules, and in particular to systems and methods for blind sensitivity matching for microphone capsules in a microphone array.

BACKGROUND

Vehicles, such as cars, trucks, sport utility vehicles, crossover vehicles, mini-vans, all-terrain vehicles, recreational vehicles, watercraft vehicles, aircraft vehicles, or other suitable vehicles are increasingly utilizing microphone capsules and/or microphone arrays for sound detection, such as speech detection, and the like. Such microphone capsules may be disposed on the exterior and/or in the interior of a vehicle and may be susceptible to sound wave exposure variance (e.g., due in part to a physical arrangement of the microphone capsules in a microphone array and/or physical and/or electrical characteristic variances between the microphone capsules) and/or noise, such as wind and the like.

SUMMARY

An aspect of the disclosed embodiments includes a method for sensitivity matching of microphone capsules in a microphone array. The method includes: determining, for at least two microphone capsules in a microphone array, an average raw sound exposure amplitude value; calculating an average error value for the at least two microphone capsules based on the average raw sound exposure amplitude value and respective exposure values for each microphone capsule of the at least two microphone capsules; calculating an average error value as the sum of the absolute values of the differences between an exposure value of each individual capsule and an average exposure value of all of the capsules; determining, based on the average error value, a first gain step value for at least one microphone capsule of the at least two microphone capsules; determining, based on at least one of the average error value, a minimum gain value and a maximum gain value, a second gain step value for each microphone capsule of the at least one microphone capsule of the at least two microphone capsules; and adjusting a gain of the at least one microphone capsule based on the second gain step value.

Another aspect of the disclosed embodiments includes a system for sensitivity matching of microphone capsules in a microphone array. The system includes a processor and a memory. The memory includes instructions that, when executed by the processor, cause the processor to: determine, for at least two microphone capsules in a microphone array, an average raw sound exposure amplitude value; calculate an average error value for the at least two microphone capsules based on the average raw sound exposure amplitude value and respective exposure values for each microphone capsule of the at least two microphone capsules; determine, based on the average error value, a first gain step value for at least one microphone capsule of the at least two microphone capsules; determine, based on a minimum gain value and a maximum gain value, a second gain step value for each microphone capsule of the at least one microphone capsule of the at least two microphone capsules; and adjust a gain of the at least one microphone capsule based on the second gain step value.

Another aspect of the disclosed embodiments includes an apparatus for sensitivity matching of microphone capsules in a microphone array. The apparatus includes a vehicle controller configured to: receive, for each microphone capsule of at least two microphone capsules of a microphone array, a microphone input signal; determine an absolute value for each microphone input signal; determine, for the at least two microphone capsules, an average raw sound exposure amplitude value based on the absolute value based of each microphone input signal; calculate an average error value for the at least two microphone capsules based on the average raw sound exposure amplitude value and respective exposure values for each microphone capsule of the at least two microphone capsules, wherein the respective exposure values are based on the microphone input signal for each of the at least two microphone capsules; determine, based on the average error value, a first gain step value for at least one microphone capsule of the at least two microphone capsules; determine, based on a minimum gain value and a maximum gain value, a second gain step value for each microphone capsule of the at least one microphone capsule of the at least two microphone capsules; and adjust a gain of the at least one microphone capsule based on the second gain step value.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 4A-4E generally illustrate a flow diagram of a blind sensitivity matching method according to the principles of the present disclosure.

DETAILED DESCRIPTION

Figure 1:
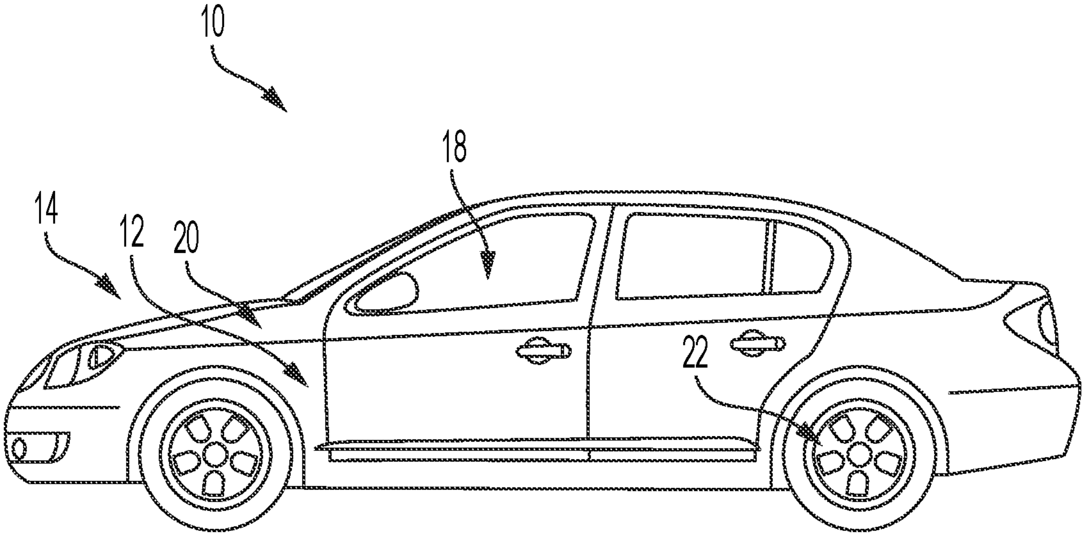
FIG. 1 generally illustrates a vehicle according to the principles of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As described, vehicles, such as cars, trucks, sport utility vehicles, crossover vehicles, mini-vans, all-terrain vehicles, recreational vehicles, watercraft vehicles, aircraft vehicles, or other suitable vehicles are increasingly utilizing microphone capsules and/or microphone arrays for sound detection, such as speech detection, and the like. Such microphone capsules may be disposed on the exterior and/or in the interior of a vehicle and may be susceptible to sound wave exposure variance (e.g., due in part to a physical arrangement of the microphone capsules in a microphone array and/or physical and/or electrical characteristic variances between the microphone capsules) and/or noise, such as wind and the like. Additionally, or alternatively, microphone capsules may be mounted to maximize the sound exposure similarity, relative to a minimum wavelength of interest Typically, use of such microphone arrays poses various challenges, such as the extraction of clean speech signals from a noise environment, reducing noise, isolating one speaker from another, and so on. Cancellation algorithms traditionally struggle with audio quality when wind strikes the microphones and/or when sound wave exposure varies (e.g., is uncorrelated) from microphone capsule to microphone capsule in the microphone array.

Using directional microphone capsules may offer an improved signal to noise ratio (SNR) compared to an OMNI microphone, prior to any advanced speech signal processing. A typical directional microphone (e.g., which may be referred to as a cardioid) may offer a 2-3 decibel (dB) SNR enhancement in practice for diffuse noise sources, and possibly 15 dB or more for noise which happens to arrive into a null angle of a directional microphone capsule.

Traditional noise reduction and/or cancellation techniques create noise estimates in the frequency domain, and eventually subtract the estimated spectrum from the real-time captured spectrum (e.g., which may include speech plus various noises). This is effective against stationary noises like driving noises (e.g., tires, road surface, constant engine, and the like) and may reduce 10 dB or more without many artifacts. However, such noise reduction algorithms struggle to remove wind buffeting or other types of uncorrelated noise.

Noise estimates that are effective against stationary noise typically operate on relatively large buffer of samples. Wind gusts striking the microphone capsules may vary in duration from very short (e.g., approximating dirac) time events, to relatively long, which manifests as mostly low frequency energy. Typical noise estimation methods, which are robust against stationary noise, may struggle with the chaotic non-stationary nature of wind buffeting.

A collection of omnidirectional microphone capsules may be configured as an array to be highly directional, maximizing sensitivity a main design axis, and maximally rejecting sound arriving from certain angles. Relatively small microphone arrays have higher wind sensitivity for the same directivity. Doubling the capsule spacing shifts the post filter to the left 1 octave, reducing the usable high frequency region due to spatial aliasing, but also reducing the wind sensitivity at the lower frequencies compared to the original spacing. More aggressive directivity (e.g., by using additional capsules) dramatically increases sensitivity to uncorrelated sources, such as wind. In such microphone arrays, the total noise term may be described according to:

$$N_T(\omega) = \sqrt{\left(H_P(\omega)\prod_{l=1}^{L}\sqrt{M_l}\,N_e(\omega)\right)^2 + \left(\frac{N_a(\omega)}{\sqrt{DI(\omega)}}\right)^2}$$

Where, NT is the total noise term, Hp is Beamformer's post-filter response, L is a number of layers in the beamformer (e.g., order for differential) M is a number of microphone capsules in the design of the beamformer, Ne is an electrical noise spectrum of a single omni capsule comprising the beamformer (e.g., with the assumption that all microphone capsules in the microphone array are the same type and model number), Na is an acoustic noise spectrum, and DI is a directivity index (e.g., which represents an amount of diffuse noise reduction compared to an omni capsule). Uncorrelated signals are additive via a root mean square (RMS) process, which is why the electrical and acoustic terms are squared, and summed under a square root.

Typically, a highly direction dynamic range of a beamformer is affected by post filtering, particularly for differential beamforming. Additionally, tradeoffs of high directivity designs may include increased wind sensitivity and electrical noise amplification (e.g., which may be more apparent in smaller footprint designs).

Figure 3:
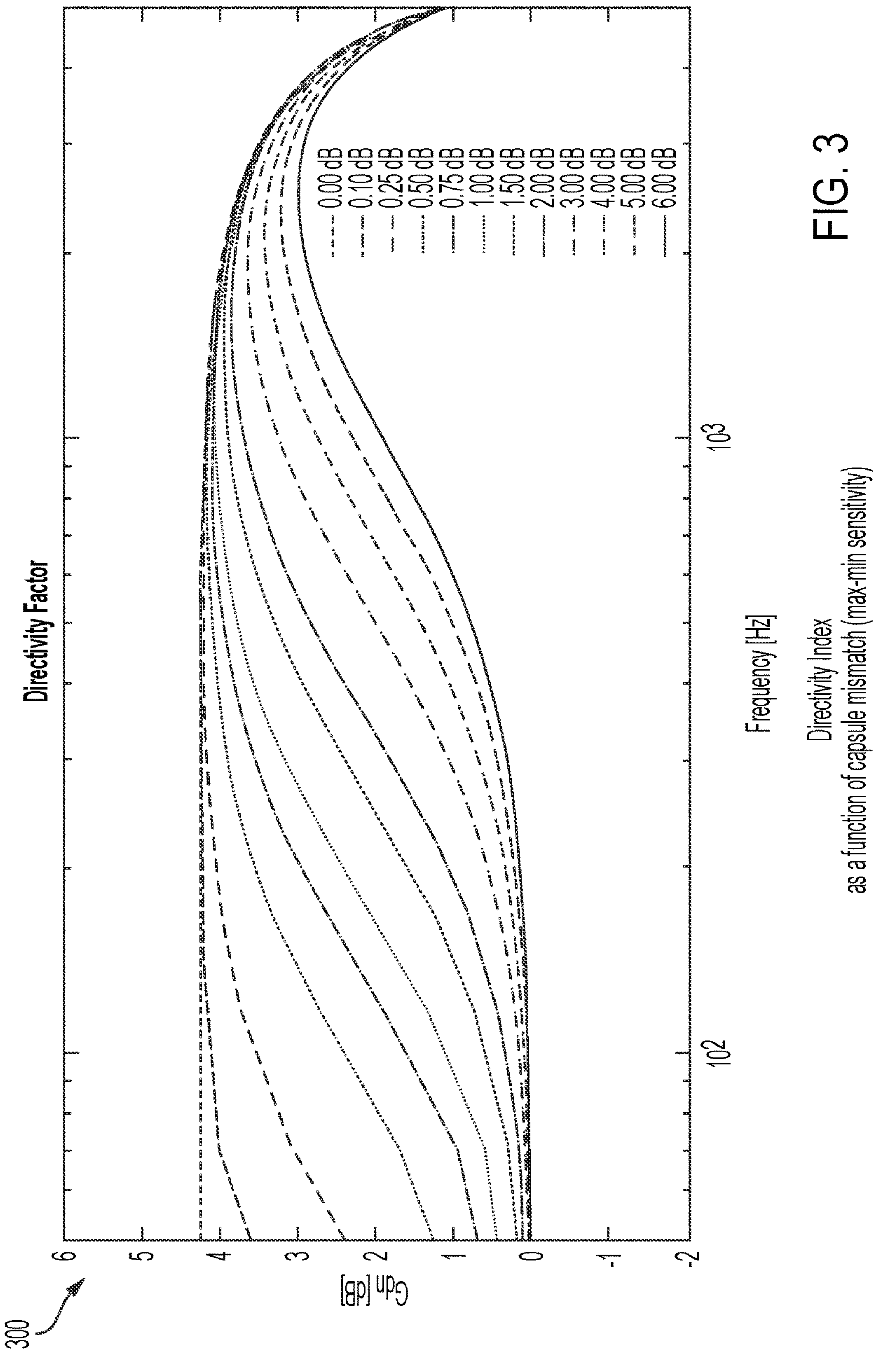
FIG. 3 generally illustrates a directivity index example according to the principles of the present disclosure.
Figure 4A:
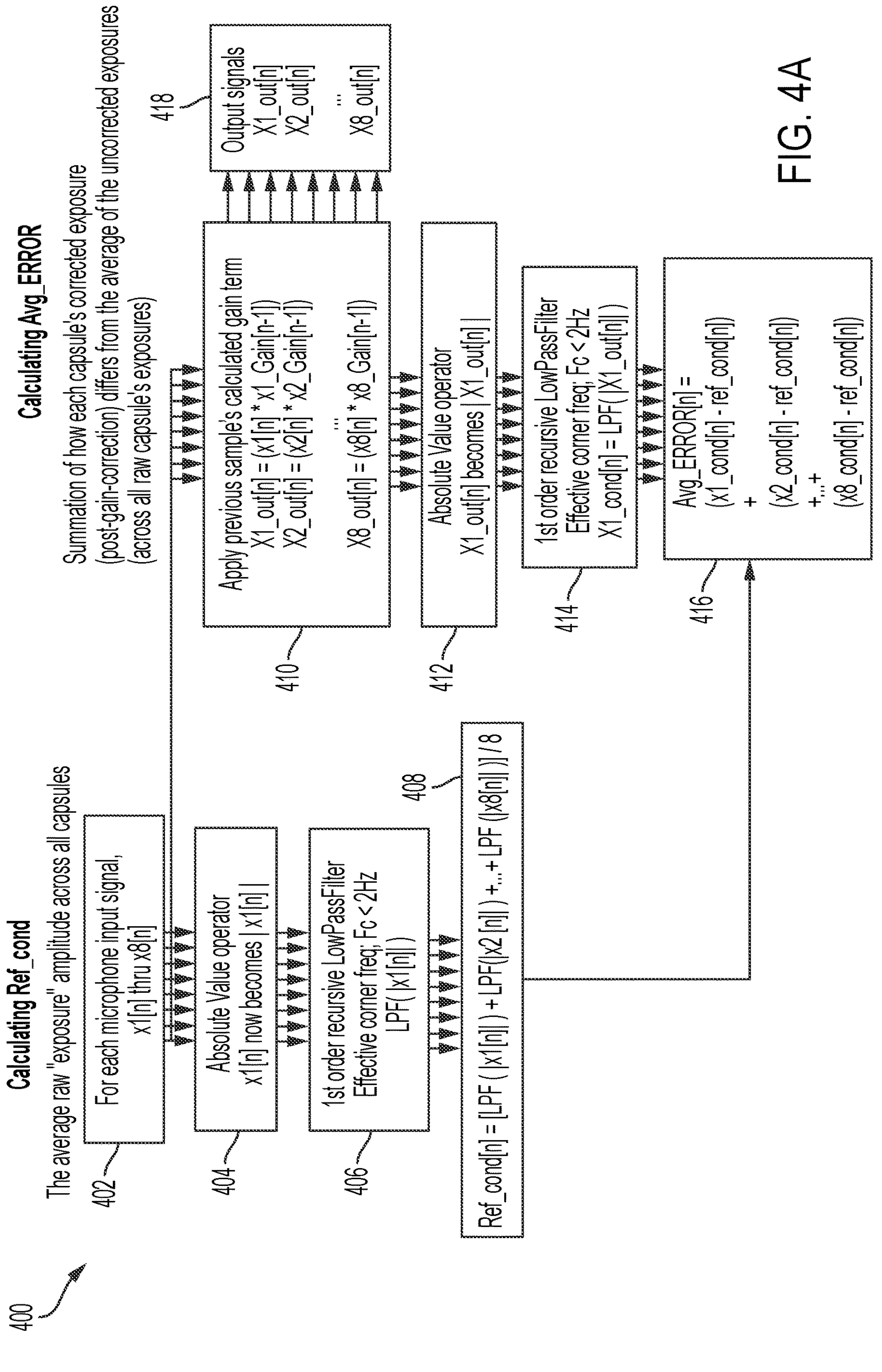
Figure 4B:
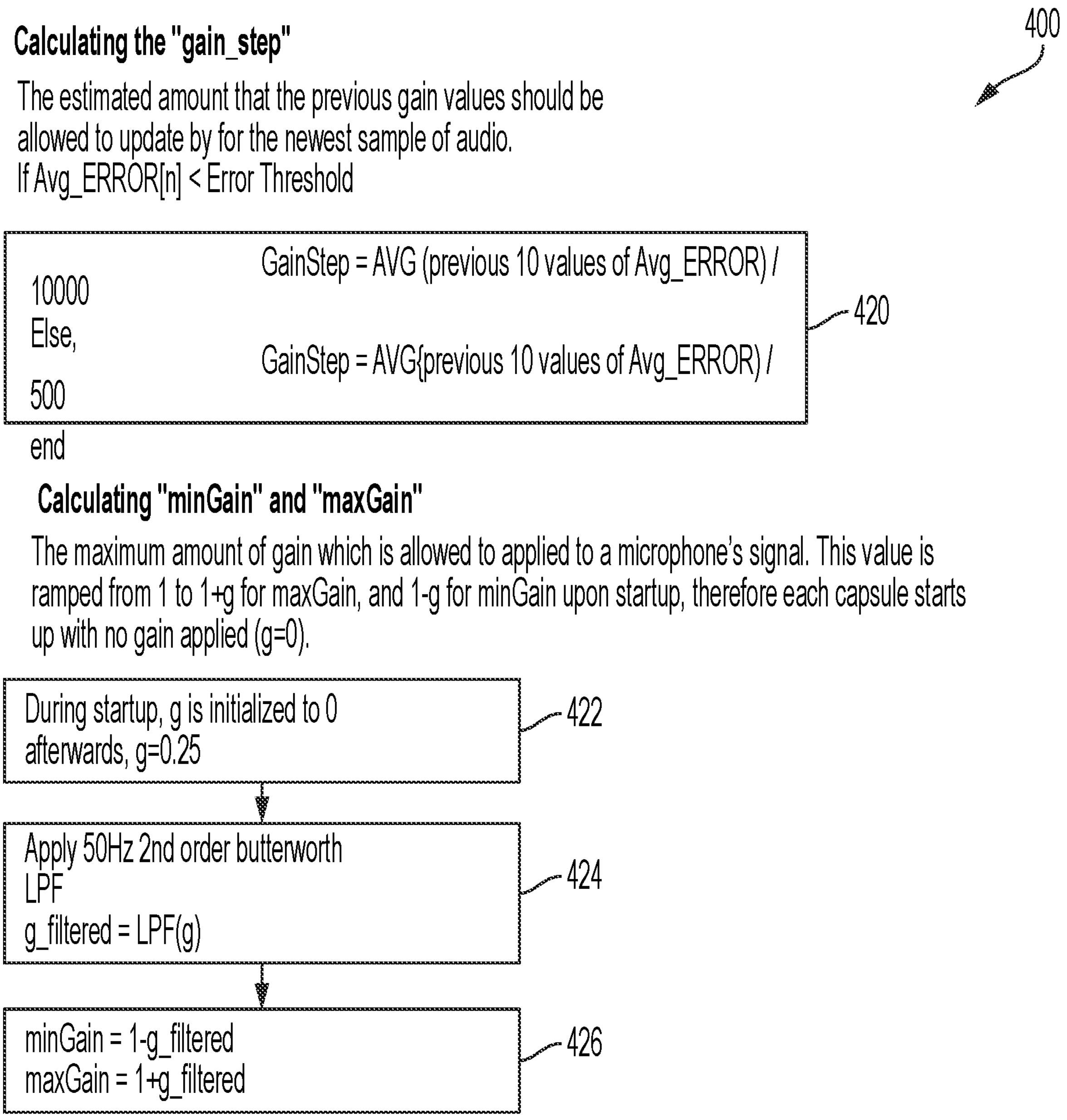
Figure 4D:
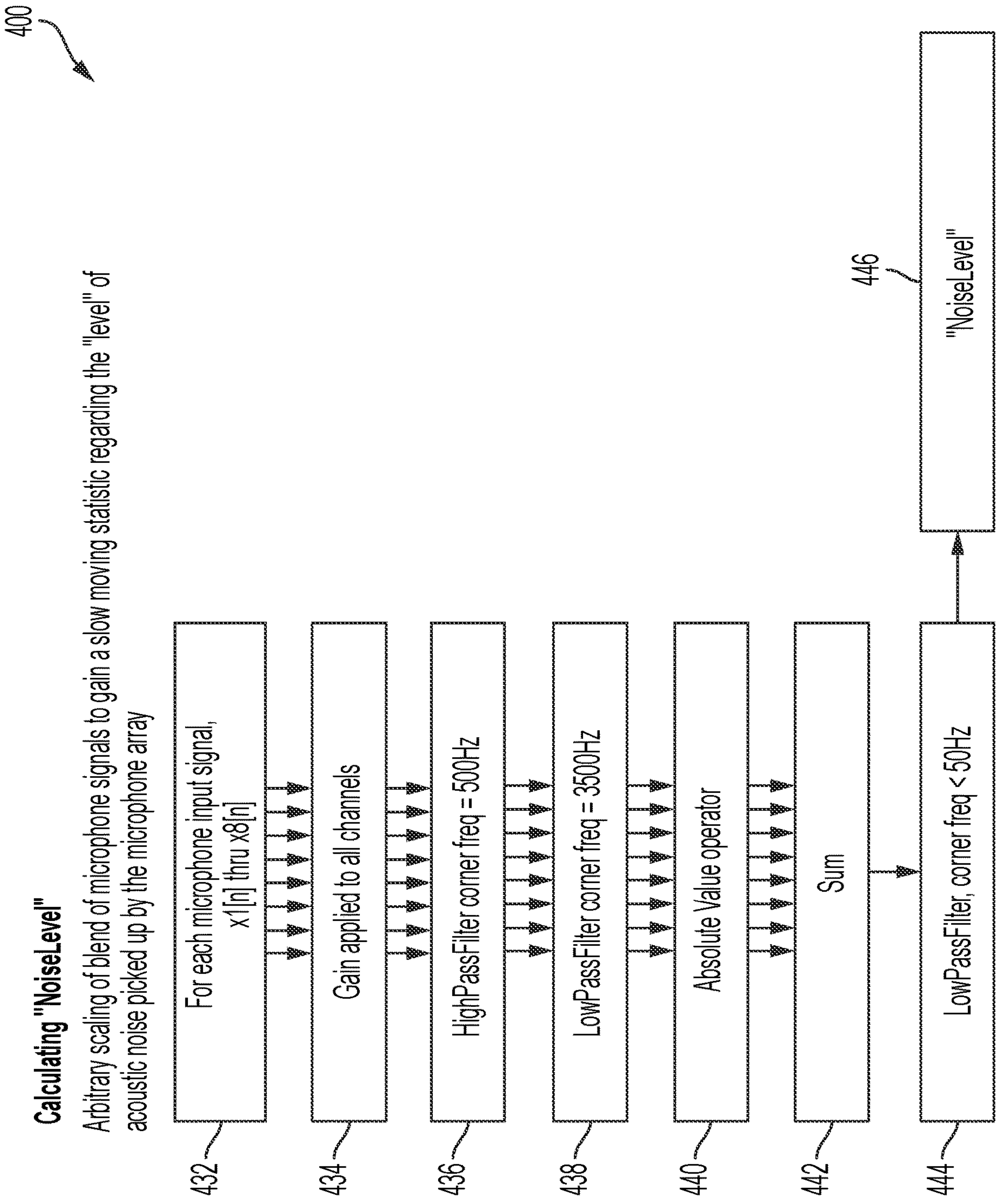

Microphone arrays, which are processed to create high directivity (e.g., beamforming), are necessarily quite vulnerable to microphone capsule sensitivity mismatch. Vulnerability is highest for signals having wavelengths that are relatively large compared to the spacing, where even small sensitivity offsets are responsible for substantial reduction in directivity index. FIG. 3 generally illustrates a chart 300 illustrating an example of a directivity index as a function of microphone capsule sensitivity mismatch as a function of frequency (e.g., illustrating how capsule sensitivity mismatch effects directivity index as a function of frequency).

Accordingly, systems and methods, such as the systems and methods described herein, configured to provide blind sensitivity matching for microphone capsules in a microphone array, may be desirable. In some embodiments, the systems and methods described herein may be configured to adjust a gain value for each microphone capsule of the microphone array to provide sensitivity matching for the microphone capsules of the microphone array. In a case where one microphone capsule is used as a reference, and the microphone capsule degrades over time, then an associated microphone capsule will also drift with reference microphone capsule, forcefully. The more microphone capsules used in generating a "target" statistic, may improve the absolute sensitivity, which may match the intended target (e.g., for example 300 mV/Pa+/−1 dB may become 300 m V/Pa+/−0.37 dB if using 8 capsules as the ref statistic, assuming Gaussian distribution of sensitivity tolerance).

Accordingly, in some embodiments, the systems and methods described herein may be configured to adjust a high mismatch of microphone capsules with an adaptation time that is proportional to the error, which may allow the mismatch to be reduced, eventually converging on a target of an adjusted gain value. The systems and methods described herein may be configured to provide a pause adaption feature that does not update a previously applied adjusted gain value in response to (i) speech audio being present, (ii) a long term average of ambient acoustic noise being less than a threshold, (iii) wind being detected, and/or (iv) the microphone array in a production environment.

In some embodiments, the systems and methods described herein may be configured to set the adjusted gain value at 1 (e.g., 0 dB) during a power up or startup mode, such that when power is cycled to a system associated with the microphone array, the capsule sensitivity mismatch is limited to the production variance of each microphone capsule. The systems and methods described herein may be configured to provide minimum and maximum gain limits, such that under all possible conditions, the total adjusted gain value applied to a microphone capsule is controlled to be no more than a boost of x (e.g., for example), and no more than an attenuation of y (e.g., for example).

The systems and methods described herein may be configured to create ideal conditions for beamforming design, such that polar patterns are maximized, even at low frequencies, and even when utilizing less precise microphone capsules.

In some embodiments, the systems and methods described herein may be configured to provide sensitivity matching of microphone capsules in a microphone array, as described. The systems and methods described herein may be configured to determine, for at least two microphone capsules in a microphone array, an average raw sound exposure amplitude value. For example, the systems and methods described herein may be configured to receive, for each of the at least two microphone capsules, a microphone input signal. The systems and methods described herein may be configured to determine an absolute value for each microphone input signal. The systems and methods described herein may be configured to determine the average raw sound exposure amplitude value based on a time averaged (e.g., low pass filtered) absolute value for each microphone input signal.

The systems and methods described herein may be configured to calculate an average error value for the at least two microphone capsules based on the average raw sound exposure amplitude value and respective exposure values for each microphone capsule of the at least two microphone capsules, after the previously calculated gain has been applied (e.g., an exposure value of an individual capsule is calculated post-gain, whereas the average exposure value for all capsules is calculated raw, before gain adjustment). The systems and methods described herein may be configured to determine, based on the average error value, a first gain step value for at least one microphone capsule of the at least two microphone capsules. For example, the systems and methods described herein may be configured to determine, based on the average error value, the first gain step value for the at least one microphone capsule of the at least two microphone capsules by determining whether the average error value is less than an error threshold. The systems and methods described herein may be configured to, in response to a determination that the average error value is less than the error threshold, determine the first gain step value by calculating an average of a predetermined number of previously calculated average error values divided by a first denominator value. The predetermined number of previously calculated average error values may be 10 previously calculated average error values or any other suitable number of previously calculated average error values and the first denominator value may be 10,000 or any other suitable number, where the denominator value scales inversely with the sum (e.g., or average) of the absolute values of the individual exposure error values.

Alternatively, in response to a determination that the average error value is not less than the error threshold, the systems and methods described herein may be configured to determine the first gain step value by calculating an average of a predetermined number of previously calculated average error values divided by a second denominator value. The predetermined number of previously calculated average error values may be 10 previously calculated average error values or any other suitable number of previously calculated average error values and the second denominator value may be 500 or any other suitable number. Additionally, or alternatively as described, the denominator value may scale inversely with the average error value.

The systems and methods described herein may be configured to determine, based on a minimum gain value and a maximum gain value, a second gain step value for each microphone capsule of the at least one microphone capsule of the at least two microphone capsules. The systems and methods described herein may be configured to adjust a gain of the at least one microphone capsule based on the second gain step value.

In some embodiments, the systems and methods described herein may be configured to set a control value associated with the minimum gain value and the maximum gain value. For example, the systems and methods described herein may be configured to set the control value to a first control value during a startup phase. The first control value may be 0 (e.g., or approximately 0) or any other suitable value. The systems and methods described herein may be configured to set the control value to a second control value after the startup phase. The second control value may be 0.25 (e.g., or approximately 0.25, equating to approximately +2/−2.5 dB) or any other suitable value. The systems and methods described herein may be configured to set the minimum gain value is 1 minus the control value or any other suitable value. The systems and methods described herein may be configured to set the maximum gain value is 1 plus the control value or any other suitable value. For example, in some embodiments, the systems and methods described herein may be configured to set the minimum and maximum gain value equal to 1, such that no gain adjustment is applied to the microphone signals (e.g., which may be the case during startup). In some embodiments, the systems and methods described herein may be configured to set the minimum and maximum gain to −2.5 dB and +2.0 dB respectively, for example.

In some embodiments, the systems and methods described herein may be configured to determine whether a pause flag is set. The pause flag may include an indication that a pause adaptation function has been initiated. For example, the pause flag may include a bit in an associated memory, a value stored in an associated memory, and/or any other suitable indicator that the pause adaptation function has been initiated. In some embodiments, the systems and methods described herein may be configured to determine whether to set the pause flag based in response to (i) speech audio being present, (ii) a long term average of ambient acoustic noise being less than a threshold, and/or (ii) the microphone array in a production environment. It is may be useful to pause adaption when speech is present, since sound is not necessarily picked up equally in all directions by all capsules in the array. Speech is a known directional sound source, and by virtue of microphone construction and mechanics, may not arrive to each capsule equally. This difference in exposure may not indicate a difference in capsule sensitivity, therefore adaption may be paused during speech and/or during exposure to long term noise which is below an amplitude threshold. If below a certain threshold, it may be the case that each capsule's individual electrical self-noise represents a majority of the signal composition, especially at low frequencies. Since self-noise is not a function of microphone acoustic sensitivity, it may be useful to pause adaption when long term ambient noise is below such a threshold.

The systems and methods described herein may be configured to, in response to a determination that the pause flag is set, set the second gain step value to 0 or other suitable value. The systems and methods described herein may be configured to, in response to a determination that the pause flag is not set, set a positive step value to 1 plus the second gain step value or other suitable value and to set a negative step value to 1 minus the second gain step value or other suitable value. The systems and methods described herein may be configured to adjust the sensitivity (e.g., the gain) of the at least one microphone capsule further based on the positive step value and the negative step value.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels 22 and for use on roads, the principles of the present disclosure may apply to other vehicles, such as planes, boats, trains, drones, or other suitable vehicles. The vehicle 10 may include any level of automation, such that the vehicle 10 may comprise no automation or may comprise a semi-autonomous vehicle or autonomous vehicle. It should be understood that, while a vehicle is provided as an example application of the systems and methods described herein, the systems and methods described herein may be applied to any suitable application, including, but not limited to, virtual assistants, home automation systems, and the like.

The vehicle 10 includes a vehicle body 12, a hood 14, and a passenger compartment 18 at least partially defined by the vehicle body 12. The hood 14 may be moveably attached to a portion of the vehicle body 12, such that the hood 14 provides access to an engine compartment 20. In some embodiments, the engine compartment 20 may be disposed in a rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system (e.g., house at least partially within the engine compartment 20) including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. Additionally, or alternatively, propulsion controls, such as an accelerator actuator (e.g., an accelerator pedal), a brake actuator (e.g., a brake pedal), a steering wheel, and other such components are disposed in the passenger compartment 18. The propulsion controls may be actuated or controlled by a driver of the vehicle 10 and may be directly connected to corresponding components of the propulsion system, such as a throttle, a brake, a vehicle axle, a vehicle transmission, and the like, respectively.

In some embodiments, the vehicle 10 includes a transmission that may include a manual transmission, an automatic transmission, and the like. The vehicle 10 may include one or more pistons, in the case of an internal combustion engine or a hybrid vehicle, which cooperatively operate with a crankshaft to generate force, which is translated through the transmission to one or more axles, which turns wheels 22. When the vehicle 10 includes one or more electric motors, one or more vehicle batteries and/or one or more fuel cells provide energy to the electric motors to turn the wheels 22.

In some embodiments, the vehicle 10 may include a suitable communication network, such as a controller area network (CAN) comprising a CAN bus or other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

Figure 2:
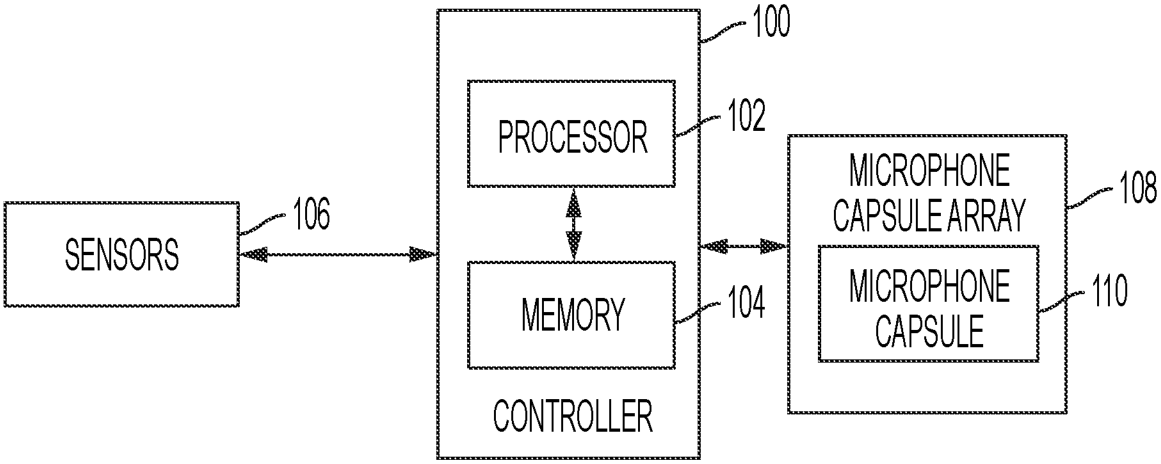
FIG. 2 generally illustrates a vehicle controller according to the principles of the present disclosure.

In some embodiments, the steering system may include a controller, such as controller 100, as is generally illustrated in FIG. 2. The controller 100 may include any suitable controller. The controller 100 may be configured to control, for example, the various functions of the vehicle systems described herein. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various functions of the steering system and/or any other suitable function, including those of the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more motor position sensors or devices, one or more image capturing sensors or devices, one or more audio capturing sensors or devices, other suitable sensors or devices, or a combination thereof. The one or more signals may indicate a vehicle speed, image data corresponding to an environment of the vehicle 10, audio data associated with the environment or other aspects of the vehicle 10, other suitable information, or a combination thereof.

In some embodiments, the controller 100 may be in communication with a microphone array 108 comprising one or more microphone capsules 110. The microphone array 108 may be disposed within an interior of the vehicle 10 or on an exterior portion of the vehicle 10. The microphone array 108 may be associated with any suitable aspect or feature of the vehicle 10. The microphone array 108 may include any suitable number of microphone capsules 110 (e.g., such as 2, 3, 4, 5, 6, 7, 8, 9, 10, or any other suitable number of microphone capsules 110). The microphone capsules 110 of the microphone array 108 may be arranged in any suitable geometry. Each microphone capsule 110 may include any suitable microphone capsule, include, in addition to, or instead of those described herein.

As described, the microphone capsules 110 may be susceptible to sensitivity mismatch as a function of the manufacturing process, material sciences, and/or uncertainty in measurements belonging to both (e.g., and/or any other suitable reason). Accordingly, in some embodiments, the controller 100 may be configured to provide sensitivity matching of the microphone capsules 110. The controller 100 may determine, for the microphone capsules 110, an average raw sound exposure amplitude value. For example, the controller 100 may receive, for each of the microphone capsules 110, a microphone input signal. The controller 100 may determine an absolute value for each microphone input signal. The controller 100 may determine the average raw sound exposure amplitude value based on the absolute value for each microphone input signal.

The controller 100 may calculate an average error value for the microphone capsules 110 based on the average raw sound exposure amplitude value from each microphone capsule 110 and respective post-corrected-gain-applied exposure values for each microphone capsule 110. The controller 100 may determine, based on the average error value, a first gain step value for at least one microphone capsule 110. For example, the controller 100 may determine, based on the average error value, the first gain step value for the at least one microphone capsule 110 by determining whether the average error value is less than an error threshold. The controller 100 may, in response to a determination that the average error value is less than the error threshold, determine the first gain step value by calculating an average of a predetermined number of previously calculated average error values divided by a first denominator value. The predetermined number of previously calculated average error values may be 10 previously calculated average error values or any other suitable number of previously calculated average error values and the first denominator value may be 10,000 or any other suitable number.

Alternatively, in response to a determination that the average error value is not less than the error threshold, the controller 100 may determine the first gain step value by calculating an average of a predetermined number of previously calculated average error values divided by a second denominator value. The predetermined number of previously calculated average error values may be 10 previously calculated average error values or any other suitable number of previously calculated average error values and the second denominator value may be 500 or any other suitable number. It should be understood that the controller 100 (e.g., and/or any of the systems and methods described herein) may be configured to recursively determine the average error values, as described.

The controller 100 may determine, based on a minimum gain value and a maximum gain value, a second gain step value for each microphone capsule 110. The controller 100 may adjust a gain of the at least one microphone capsule 110 based on the second gain step value. It should be understood that the controller 100 (e.g., and/or any of the systems and methods described herein) may be configured to adjust the gain for each and/or all microphone capsules 110, as described. Additionally, or alternatively, the controller 100 (e.g., and/or any of the systems and methods described herein) may be configured to recursively adjust the gain of each and/or all microphone capsules 110.

In some embodiments, the controller 100 may set a control value associated with the minimum gain value and the maximum gain value. For example, the controller 100 may set the control value to a first control value during a startup phase. The first control value may be 0 (e.g., or approximately 0) or any other suitable value. The controller 100 may set the control value to a second control value after the startup phase. The second control value may be 0.25 (e.g., or approximately 0.25) or any other suitable value. The controller 100 may set the minimum gain value as 1 minus the control value or any other suitable value. The controller 100 may set the maximum gain value is 1 plus the control value or any other suitable value.

In some embodiments, the systems and methods described herein may be configured to determine whether a pause flag is set. The pause flag may include an indication that a pause adaptation function has been initiated. For example, the pause flag may include a bit in an associated memory, a value stored in an associated memory, and/or any other suitable indicator that the pause adaptation function has been initiated. In some embodiments, controller 100 may determine whether to set the pause flag based in response to (i) speech audio being present, (ii) a long term average of ambient acoustic noise being less than a threshold, and/or (ii) the microphone array 108 in a production environment.

The controller 100 may, in response to a determination that the pause flag is set, set the second gain step value to 0 or other suitable value. The controller 100 may, in response to a determination that the pause flag is not set, set a positive step value to 1 plus the second gain step value or other suitable value and to set a negative step value to 1 minus the second gain step value or other suitable value. The controller 100 may adjust the gain of the at least one microphone capsule further based on the positive step value and the negative step value.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

FIGS. 4A-4E, is a flow diagram generally illustrating a blind sensitivity matching method 400 according to the principles of the present disclosure. At 402, the method 400 receives, for each microphone capsule, a microphone input signal. For example, the controller 100 may receive, for each microphone capsule 110, microphone input signals (e.g., which may be referred to as x1[n] through x8[n]).

At 404, the method 400 determines an absolute value for each microphone input signal, x1[n]-x8[n]. For example, the controller 100 may determine the absolute value for each microphone input signal.

At 406, the method 400 applies a first order recursive low pass filter (LPF) having an effective corner frequency of Fc<2 Hertz (Hz) (e.g., or other suitable frequency) to the absolute values of the microphone input signals. For example, the controller 100 may apply the LPF to the absolute values of the microphone input signals.

At 408, the method 400 determines an average raw sound exposure amplitude (e.g., referred to as Ref_cond) across all microphone capsules 110, where the average raw sound exposure amplitude is the sum of the output of the LPF for each absolute value of each microphone input signal divided by the total number of microphone capsules 110 (e.g., 8 or other total). For example, the controller 100 may determine the average raw sound exposure amplitude.

At 410, the method 400 applies a previous calculated gain term from the previous sample for each microphone capsule 110. The method 400 may determine an output (e.g., referred to as X1_out[n], X2_out[n], and so on) for each microphone capsule 110. For example, the controller 100 may apply the previous calculated gain term and determine the output for each microphone capsule 110. The sensitivity-adjusted output 418 for a respective microphone capsule 110 may be calculated by multiplying a current input signal of the respective microphone capsule 110 by a previously calculated gain term for the respective microphone capsule 110.

At 412, the method 400 determines the absolute value for each sensitivity-adjusted output 418 for each microphone capsule 110. For example, the controller 100 may determine the absolute value for each output for each microphone capsule 110.

At 414, the method 400 a first order recursive low pass filter (LPF) having an effective corner frequency of Fc<2 Hertz (Hz) (e.g., or other suitable frequency such that the frequency is equal or substantially equal to the LPF of 406) to the absolute values of the outputs for each microphone capsule 110. For example, the controller 100 may apply the LPF to the absolute values of the sensitivity-adjusted outputs 418 of each microphone capsules 110. The output of the LPF may be referred to as X1_cond[n] for a first microphone capsule 110 and so on.

At 416, the method 400 determines an average error (e.g., referred to as Avg_ERROR[n]) for microphone capsules 110. For example, the controller 100 may determine, for each microphone capsule 110, a difference between the output of the LPF, calculated at 414, and the average raw sound exposure amplitude, calculated at 418. The controller 100 may determine the average error by determining the sum of the differences of the LPF, calculated at 414, for each respective microphone capsule 110 and the average raw sound exposure amplitude, calculated at 408.

At 418, the method 400 outputs the output signals X1_out [n], X2_out[n] . . . . X8_out[n], and so on. For example, the controller 100 may output the output signals.

At 420, the method 400 determines a gain step value. For example, the controller 100 may determine the gain step value. The controller 100 may determine whether the average error is less than an error threshold. If the controller 100 determines that the average error value is less than the error threshold, the controller 100 sets the gain step value equal to the average of the 10 previously calculated average error values, divided by 10000. Alternatively, if the controller 100 determines that the average error value is not less than the error threshold, the controller 100 sets the gain step value equal to the average of the 10 previously calculated average error values, divided by 500 (e.g., therefore large values of Avg_ERROR result in relatively large gain step values, and vice-versa).

The method 400 may determine a minimum gain value and a maximum gain value. For example, At 422, the method 400, during startup, sets a control value (e.g., g) to 0, and to 0.25 after startup. For example, the controller 100 may, during start up, set the control value to 0, and to 0.25 after startup.

At 424, the method 400 applies a 50 Hz (e.g., or other suitable value) second order butterworth (e.g. or other suitable type) LPF to the control value. For example, the controller 100 may apply the second order LPF to the control value (e.g., thus, after a length of time determined by the LPF designed time constant, the control value reaches an intended design value).

At 426, the method 400 sets the minimum gain value to 1 minus the filtered control value and the maximum gain value to 1 plus the filtered control value. For example, the controller 100 may set the minimum gain value to 1 minus the filtered control value and the maximum gain value to 1 plus the filtered control value.

The method 400 may determine a positive step gain value and a negative step gain value. For example, at 428, the method 400 determines whether a pause adapt flag is set to true. For example, the controller 100 may determine whether the pause adapt flag is set to true. If the controller 100 determines that the pause adapt flag is set to true, the controller 100 sets the gain step to 0. Alternatively, if the controller 100 determines that the pause adapt flag is not set to true, the controller 100 sets the positive step gain value to 1 plus the gain step and the negative step gain value to 1 minus the gain step. The gain step is bounded by the minimum gain value and the maximum gain value.

At 430, the method 400 determines whether to set the pause adapt flag. For example, the controller 100 may determine whether to set the pause adapt flag. The controller 100 may set the pause adapt flag to true in response to a determination that a noise level is less than a minimum noise threshold or that wind is detected. The controller 100 may set the pause adapt flag to true in response to a determination that the noise level is between the minimum threshold and a maximum threshold and that voice audio is detected. Otherwise, the controller 100 may set the pause adapt flag to false in response to the noise level being greater than a maximum threshold.

The method 400 may calculate a noise level present at the microphone capsules 110. For example, at 432, the method 400 receives the microphone input signals. For example, the controller 100 receives the microphone input signals.

At 434, the method 400 applies a gain to all channels. For example, the controller 100 applies a gain to all microphone capsule 110 channels. The gain may be 30 dB or other suitable value.

At 436, the method 400 applies a high pass filter having a corner frequency of 500 Hz or other suitable value. For example, the controller 100 may apply the high pass filter to the microphone input signals.

At 438, the method 400 applies a low pass filter having a corner frequency of 3500 Hz or other suitable value. For example, the controller 100 may apply the low pass filter to the microphone input signals.

At 440, the method 400 determines an absolute value of the filtered microphone input signals. For example, the controller 100 may determine the absolute value of the filtered microphone input signals.

At 442, the method 400 determines the sum of the absolute values. For example, the controller 100 determines the sum of the absolute values.

At 444, the method 400 applies a low pass filter having a corner frequency of less than 50 Hz or other suitable value. For example, the controller 100 may apply the low pass filter to the sum of the absolute values.

At 446, the method 400 determines the noise level. For example, the controller 100 sets the noise level equal to the filtered sum of the absolute values.

At 448, the method 400 calculates the gain term, unique for each microphone capsule 110. For example, the controller 100 calculates the gain term. The controller 100 may determine, for a first microphone capsule 110, whether X1_cond[n] is less than the Ref_cond[n]. If the controller 100 determines that X1_cond[n] is less than the Ref_cond [n], the controller 100 sets the gain for the first microphone capsule 110 to the previous gain multiplied by the positive step gain value. Alternatively, if the controller determines that X1_cond[n] is not less than the Ref_cond[n], the controller 100 sets the gain for the first microphone capsule 110 to the previous gain multiplied by the negative step gain value. The controller 100 may determine whether the set gain value for the first microphone capsule 110 is less than or equal to the minimum gain value. If the controller 100 determines that the set gain value for the first microphone capsule 110 is less than or equal to the minimum gain value, the controller 100 sets the gain value equal to the minimum gain value. Additionally, or alternatively, in response to the gain value being greater than or equal to the maximum gain value, the controller 100 sets the gain value equal to the maximum gain value.

Figure 5:
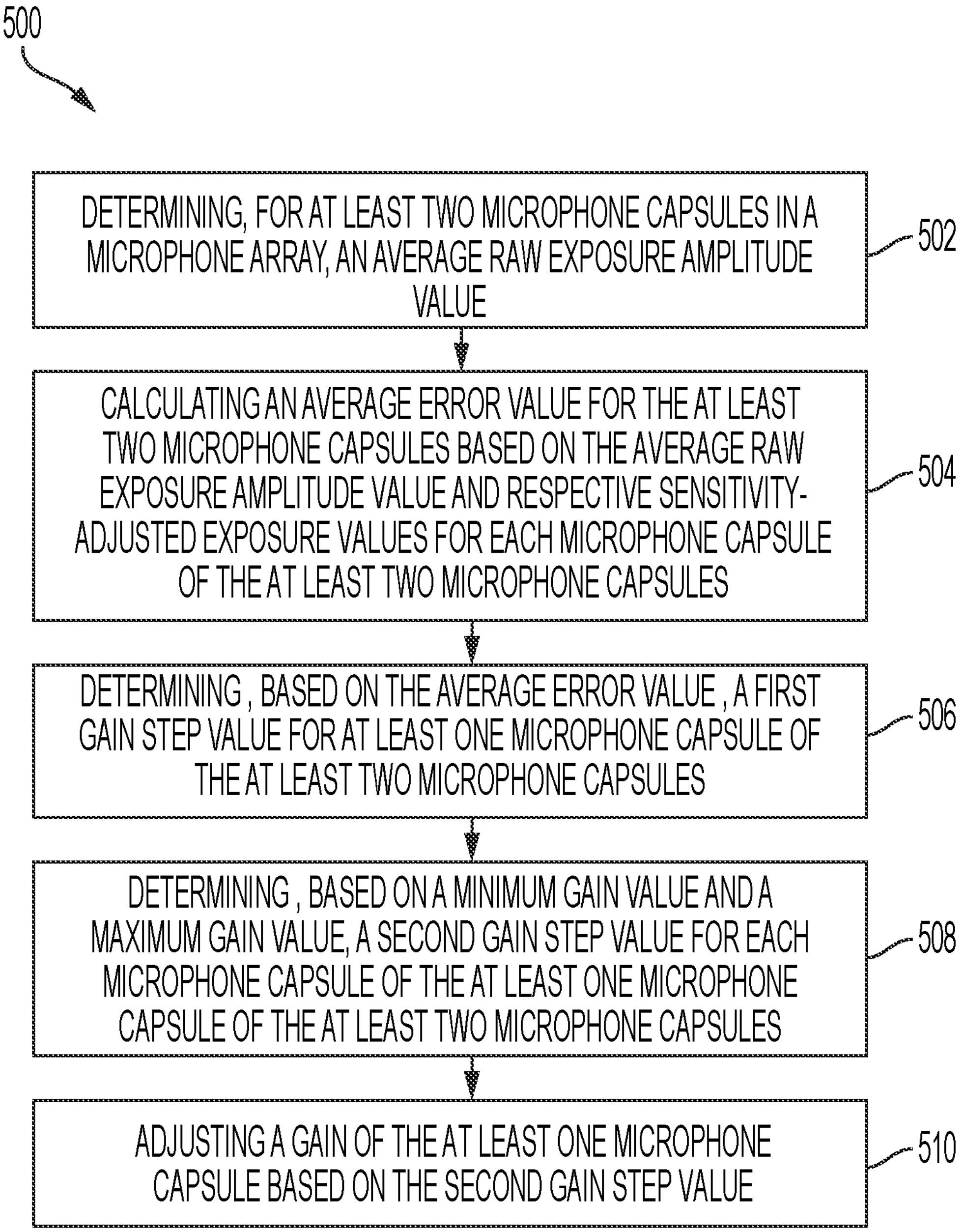
FIG. 5 generally illustrates a flow diagram of an alternative blind sensitivity matching method according to the principles of the present disclosure.

FIG. 5 is a flow diagram generally illustrating an alternative blind sensitivity matching method 500 according to the principles of the present disclosure. At 502, the method 500 determines, for at least two microphone capsules in a microphone array, an average raw sound exposure amplitude value. For example, the controller 100 may determine, for at least two microphone capsules 110 of the microphone array 108, the average raw sound exposure amplitude value.

At 504, the method 500 calculates an average error value for the at least two microphone capsules based on the average raw sound exposure amplitude value and respective sensitivity-adjusted exposure values, for each microphone capsule of the at least two microphone capsules. For example, the controller 100 may calculate the average error value for the at least two microphone capsules 110 based on the average raw sound exposure amplitude value and respective sensitivity-adjusted exposure values for each microphone capsule 110 of the at least two microphone capsules 110.

At 506, the method 500 determines, based on the average error value, a first gain step value for at least one microphone capsule of the at least two microphone capsules. For example, the controller 100 may determine, based on the average error value, the first gain step value for the at least one microphone capsule 110 of the at least two microphone capsules 110.

At 508, the method 500 determines, based on a minimum gain value and a maximum gain value, a second gain step value for each microphone capsule of the at least one microphone capsule of the at least two microphone capsules. For example, the controller 100 may determine, based on the minimum gain value and the maximum gain value, the second gain step value for each microphone capsule 110 of the at least one microphone capsule 110 of the at least two microphone capsules 110.

At 510, the method 500 adjusts a gain of the at least one microphone capsule based on the second gain step value. For example, the controller 100 may adjust the gain of the at least one microphone capsule 110 based on the second gain step value.

Clause 1. A method for sensitivity matching of microphone capsules in a microphone array, the method comprising: determining, for at least two microphone capsules in a microphone array, an average raw sound exposure amplitude value; calculating an average error value for the at least two microphone capsules based on the average raw sound exposure amplitude value and respective sensitivity-adjusted exposure values for each microphone capsule of the at least two microphone capsules; determining, based on the average error value, a first gain step value for at least one microphone capsule of the at least two microphone capsules; determining, based on a minimum gain value and a maximum gain value, a second gain step value for each microphone capsule of the at least one microphone capsule of the at least two microphone capsules; and applying a sensitivity correction value by adjusting a gain of the at least one microphone capsule based on the second gain step value.

Clause 2. The method of any of the clauses herein, wherein determining, for the at least two microphone capsules in the microphone array, the average raw sound exposure amplitude value includes: receiving, for each of the at least two microphone capsules, a microphone input signal; determining an absolute value for each microphone input signal; and determining the average raw sound exposure amplitude value based on the absolute value for each microphone input signal.

Clause 3. The method of any of the clauses herein, wherein determining, based on the average error value, the first gain step value for the at least one microphone capsule of the at least two microphone capsules includes determining whether the average error value is less than an error threshold.

Clause 4. The method of any of the clauses herein, wherein, in response to a determination that the average error value is less than the error threshold, the first gain step value is determined by calculating an average of a predetermined number of previously calculated average error values divided by a first denominator value.

Clause 5. The method of any of the clauses herein, wherein the predetermined number of previously calculated average error values is 10 previously calculated average error values and the first denominator value is 10,000.

Clause 6. The method of any of the clauses herein, wherein, in response to a determination that the average error value is not less than the error threshold, the first gain step value is determined by calculating an average of a predetermined number of previously calculated average error values divided by a second denominator value.

Clause 7. The method of any of the clauses herein, wherein the predetermined number of previously calculated average error values is 10 previously calculated average error values and the second denominator value is 500.

Clause 8. The method of any of the clauses herein, further comprising setting a control value associated with the minimum gain value and the maximum gain value.

Clause 9. The method of any of the clauses herein, further comprising setting the control value to a first control value during a startup phase and setting the control value to a second control value after the startup phase.

Clause 10. The method of any of the clauses herein, wherein the first control value is 0 and the second control value is 0.25.

Clause 11. The method of any of the clauses herein, wherein the minimum gain value is 1 minus the control value.

Clause 12. The method of any of the clauses herein, wherein the maximum gain value is 1 plus the control value.

Clause 13. The method of any of the clauses herein, further comprising determining whether a pause flag is set.

Clause 14. The method of any of the clauses herein, further comprising, in response to a determination that the pause flag is set, setting the second gain step value to 0.

Clause 15. The method of any of the clauses herein, further comprising, in response to a determination that the pause flag is not set, setting a positive step value to 1 plus the second gain step value and a negative step value to 1 minus the second gain step value.

Clause 16. The method of any of the clauses herein, wherein adjusting the gain of the at least one microphone capsule is further based on the positive step value and the negative step value.

Clause 17. The method of any of the clauses herein, wherein the microphone array is associated with a vehicle.

Clause 18. A system for sensitivity matching of microphone capsules in a microphone array, the system comprising: a processor; and a memory including instructions that, when executed by the processor, cause the processor to: determine, for at least two microphone capsules in a microphone array, an average raw sound exposure amplitude value; calculate an average error value for the at least two microphone capsules based on the average raw sound exposure amplitude value and respective exposure values for each microphone capsule of the at least two microphone capsules; determine, based on the average error value, a first gain step value for at least one microphone capsule of the at least two microphone capsules; determine, based on a minimum gain value and a maximum gain value, a second gain step value for each microphone capsule of the at least one microphone capsule of the at least two microphone capsules; and adjust a gain of the at least one microphone capsule based on the second gain step value.

Clause 19. The system of any of the clauses herein, wherein the instructions further cause the processor to determine, for the at least two microphone capsules in the microphone array, the average raw sound exposure amplitude value by: receiving, for each of the at least two microphone capsules, a microphone input signal; determining an absolute value for each microphone input signal; and determining the average raw sound exposure amplitude value based on the absolute value of each microphone input signal.

Clause 20. An apparatus for sensitivity matching of microphone capsules in a microphone array, the apparatus comprising: a vehicle controller configured to: receive, for each microphone capsule of at least two microphone capsules of a microphone array, a microphone input signal; determine an absolute value for each microphone input signal; determine, for the at least two microphone capsules, an average raw sound exposure amplitude value based on the absolute value based of each microphone input signal; calculate an average error value for the at least two microphone capsules based on the average raw sound exposure amplitude value and respective exposure values for each microphone capsule of the at least two microphone capsules, wherein the respective exposure values are based on the microphone input signal for each of the at least two microphone capsules; determine, based on the average error value, a first gain step value for at least one microphone capsule of the at least two microphone capsules; determine, based on a minimum gain value and a maximum gain value, a second gain step value for each microphone capsule of the at least one microphone capsule of the at least two microphone capsules; and adjust a gain of the at least one microphone capsule based on the second gain step value.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for sensitivity matching of microphone capsules in a microphone array, the method comprising:

determining, for at least two microphone capsules in a microphone array, an average raw sound exposure amplitude value;

calculating an average error value for the at least two microphone capsules based on the average raw sound exposure amplitude value and respective sensitivity-adjusted exposure values for each microphone capsule of the at least two microphone capsules;

determining, based on the average error value, a gain for at least one microphone capsule of the at least two microphone capsules;

determining, based on a minimum gain value and a maximum gain value, a gain step value for each microphone capsule of the at least one microphone capsule of the at least two microphone capsules;

adjusting the gain of the at least one microphone capsule based on the gain step value;

setting a control value associated with the minimum gain value and the maximum gain value; and setting the control value to a first control value during a startup phase and setting the control value to a second control value after the startup phase.

2. The method of claim 1, wherein determining, for the at least two microphone capsules in the microphone array, the average raw sound exposure amplitude value includes:

receiving, for each of the at least two microphone capsules, a microphone input signal;

determining an absolute value for each microphone input signal; and determining the average raw sound exposure amplitude value based on the absolute value for each microphone input signal.

3. The method of claim 1, wherein determining, based on the average error value, the gain for the at least one microphone capsule of the at least two microphone capsules includes determining whether the average error value is less than an error threshold.

4. The method of claim 3, wherein, in response to a determination that the average error value is less than the error threshold, the gain is determined by calculating an average of a predetermined number of previously calculated average error values divided by a first denominator value.

5. The method of claim 4, wherein the predetermined number of previously calculated average error values is 10 previously calculated average error values and the first denominator value is 10,000.

6. The method of claim 3, wherein, in response to a determination that the average error value is not less than the error threshold, the gain is determined by calculating an average of a predetermined number of previously calculated average error values divided by a second denominator value.

7. The method of claim 6, wherein the predetermined number of previously calculated average error values is 10 previously calculated average error values and the second denominator value is 500.

8. The method of claim 1, wherein the first control value is 0 and the second control value is 0.25.

9. The method of claim 1, wherein the minimum gain value is 1 minus the control value.

10. The method of claim 1, wherein the maximum gain value is 1 plus the control value.

11. The method of claim 1, further comprising determining whether a pause flag is set.

12. The method of claim 11, further comprising, in response to a determination that the pause flag is set, setting the gain step value to 0.

13. The method of claim 11, further comprising, in response to a determination that the pause flag is not set, setting a positive step value to 1 plus the gain step value and a negative step value to 1 minus the gain step value.

14. The method of claim 13, wherein adjusting the gain of the at least one microphone capsule is further based on the positive step value and the negative step value.

15. The method of claim 1, wherein the microphone array is associated with a vehicle.

16. A system for sensitivity matching of microphone capsules in a microphone array, the system comprising:

a processor; and a memory including instructions that, when executed by the processor, cause the processor to:

determine, for at least two microphone capsules in a microphone array, an average raw sound exposure amplitude value;

calculate an average error value for the at least two microphone capsules based on the average raw sound exposure amplitude value and respective sensitivity-adjusted exposure values for each microphone capsule of the at least two microphone capsules;

determine, based on the average error value, a gain for at least one microphone capsule of the at least two microphone capsules;

determine, based on a minimum gain value and a maximum gain value, a gain step value for each microphone capsule of the at least one microphone capsule of the at least two microphone capsules;

adjust the gain of the at least one microphone capsule based on the gain step value;

set a control value associated with the minimum gain value and the maximum gain value; and set the control value to a first control value during a startup phase and setting the control value to a second control value after the startup phase.

17. The system of claim 16, wherein the instructions further cause the processor to determine, for the at least two microphone capsules in the microphone array, the average raw sound exposure amplitude value by:

receiving, for each of the at least two microphone capsules, a microphone input signal;

determining an absolute value for each microphone input signal; and determining the average raw sound exposure amplitude value based on the absolute value of each microphone input signal.

18. An apparatus for sensitivity matching of microphone capsules in a microphone array, the apparatus comprising:

a vehicle controller configured to:

receive, for each microphone capsule of at least two microphone capsules of a microphone array, a microphone input signal;

determine an absolute value for each microphone input signal;

determine, for the at least two microphone capsules, an average raw sound exposure amplitude value based on the absolute value based of each microphone input signal;

calculate an average error value for the at least two microphone capsules based on the average raw sound exposure amplitude value and respective sensitivity-adjusted exposure values for each microphone capsule of the at least two microphone capsules, wherein the respective sensitivity-adjusted exposure values are based on the microphone input signal for each of the at least two microphone capsules;

determine, based on the average error value, a gain for at least one microphone capsule of the at least two microphone capsules;

determine, based on a minimum gain value and a maximum gain value, a gain step value for each microphone capsule of the at least one microphone capsule of the at least two microphone capsules;

adjust the gain of the at least one microphone capsule based on the gain step value;

set a control value associated with the minimum gain value and the maximum gain value; and set the control value to a first control value during a startup phase and setting the control value to a second control value after the startup phase.

* * * * *